US009960684B2

(12) United States Patent
Luccato

(10) Patent No.: US 9,960,684 B2
(45) Date of Patent: May 1, 2018

(54) ELECTRONIC CONVERTER, AND RELATED LIGHTING SYSTEM AND METHOD OF OPERATING AN ELECTRONIC CONVERTER

(71) Applicant: OSRAM GmbH, Munich (DE)

(72) Inventor: Daniele Luccato, Vittorio Veneto (IT)

(73) Assignee: OSRAM GmbH, Munich (DE)

( * ) Notice: Subject to any disclaimer, the term of this patent is extended or adjusted under 35 U.S.C. 154(b) by 61 days.

(21) Appl. No.: 14/038,844

(22) Filed: Sep. 27, 2013

(65) Prior Publication Data

US 2014/0092643 A1 Apr. 3, 2014

(30) Foreign Application Priority Data

Sep. 28, 2012 (IT) .............................. TO2012A0849

(51) Int. Cl.
    *H02M 1/34* (2007.01)
    *H02M 3/335* (2006.01)
    *H05B 33/08* (2006.01)

(52) U.S. Cl.
    CPC ......... *H02M 3/33507* (2013.01); *H02M 1/34* (2013.01); *H02M 3/335* (2013.01);
    (Continued)

(58) Field of Classification Search
    CPC .. H02M 3/335; H02M 1/34; H02M 2001/348; H02M 2001/342;
    (Continued)

(56) References Cited

U.S. PATENT DOCUMENTS 4,103,187 A * 7/1978 Imamura .............. H03K 17/223
                                                 327/437
4,785,387 A * 11/1988 Lee ......................... H02M 3/28
                                                 363/131

(Continued)

FOREIGN PATENT DOCUMENTS

| EP | 1202440 A1 | 5/2002 |
| EP | 2204899 A2 | 7/2010 |
| GB | 2324661 A  | 10/1998 |

OTHER PUBLICATIONS

Philip C. Todd, "Snubber circuits: Theory, Design and Application", May 1993, 17 pages, Unitrode Corporation.

(Continued)

*Primary Examiner* — Gary L Laxton
(74) *Attorney, Agent, or Firm* — Viering, Jentschura & Partner mbB

(57) ABSTRACT

An electronic converter may include transformer with a primary winding and a secondary winding, wherein the primary winding is coupled to an input for receiving a power signal, and wherein the secondary winding is coupled to an output including a positive terminal and a negative terminal for providing a power signal. The converter moreover may include an electronic switch arranged between the input and the primary winding, wherein the electronic switch is configured to control the current flow through the primary winding. Specifically, the converter may include a snubber circuit arranged between the secondary winding and the output.

3 Claims, 8 Drawing Sheets

(52) U.S. Cl.
CPC ... *H05B 33/0815* (2013.01); *H02M 2001/346* (2013.01); *Y02B 70/1491* (2013.01)

(58) Field of Classification Search
CPC ...... H02M 2001/344; H02M 2001/346; Y02B 70/1491
USPC .......... 363/21.04, 21.12, 56.09, 56.11, 56.12
See application file for complete search history.

(56) References Cited

U.S. PATENT DOCUMENTS

| | | | | |
|---|---|---|---|---|
| 5,027,263 | A | * | 6/1991 | Harada ................. H02M 3/337 363/16 |
| 5,278,748 | A | * | 1/1994 | Kitajima .................... 363/21.02 |
| 5,528,481 | A | * | 6/1996 | Caldeira ................. H02M 1/44 363/131 |
| 5,689,409 | A | * | 11/1997 | Scharlach et al. ......... 363/56.11 |
| 6,101,107 | A | * | 8/2000 | Assow ............................ 363/53 |
| 6,107,860 | A | * | 8/2000 | Vinciarelli ........... H03K 17/691 327/109 |
| 6,333,861 | B1 | * | 12/2001 | Goodman ....................... 363/20 |
| 7,880,399 | B2 | * | 2/2011 | Sießegger ......... H05B 41/2881 315/209 R |
| 8,654,483 | B2 | * | 2/2014 | Etter ....................... H02M 1/32 361/18 |
| 2004/0037100 | A1 | * | 2/2004 | Orr ................... H02M 3/33576 363/131 |
| 2005/0286272 | A1 | | 12/2005 | Iwamoto et al. |
| 2006/0072259 | A1 | | 4/2006 | Yunus |
| 2012/0249059 | A1 | * | 10/2012 | Matsumae ............ H02M 3/337 320/107 |

OTHER PUBLICATIONS

Tamotsu Ninomiya et al., "Analysis and optimization of a nondissipative LC turn-off snubber", IEEE Transactions on Power Electronics, (1988), pp. 147-156, vol. 3, No. 2.
Chih-Sheng Liao et al., "Design of high efficiency Flyback converter with energy regenerative snubber", Conference: Applied Power Electronics Conference and Exposition Annual IEEE Conference—APEC, (2008), pp. 796-800.
Bill Andreycak, "Active clamp and reset technique enhances forward converter performance", Unitrode Power Supply Design Seminar, SEM-1000, Oct. 1994, 18 pages.
Robert Watson et al., "Utilization of an Active-Clamp Circuit to Achieve Soft Switching in Flyback converters", IEEE Transactions on Power Electronics, Jan. 1996, pp. 162-169, vol. 11, No. 1, IEEE.

* cited by examiner

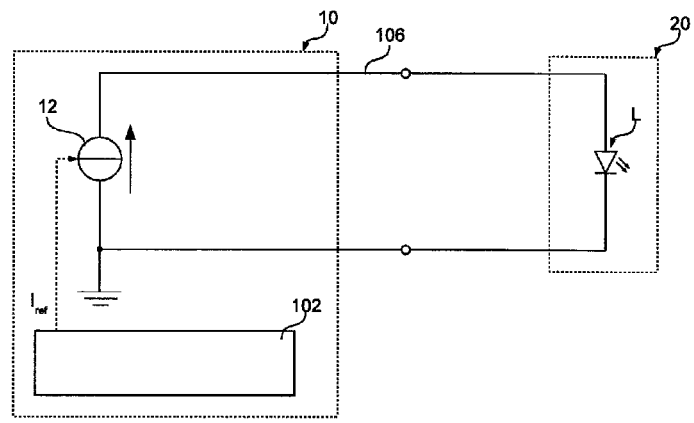
Fig. 1 - PRIOR ART
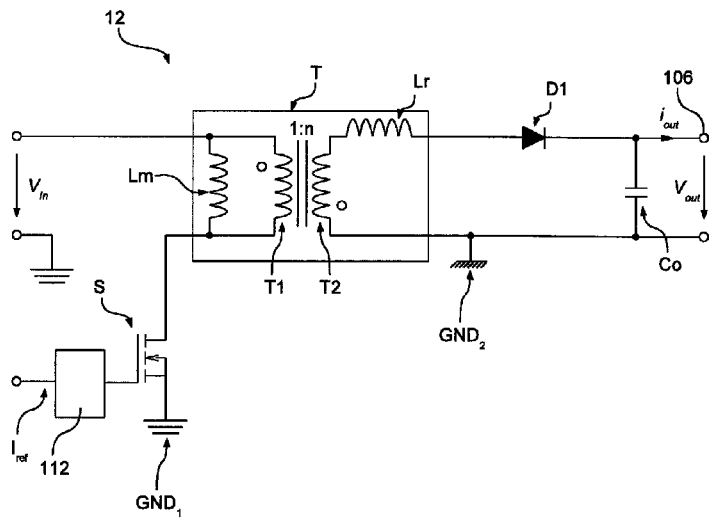
Fig. 2 - PRIOR ART

ELECTRONIC CONVERTER, AND RELATED LIGHTING SYSTEM AND METHOD OF OPERATING AN ELECTRONIC CONVERTER

RELATED APPLICATIONS

The present application claims priority from Italian application No.: TO2012A000849 filed on Sep. 28, 2012.

TECHNICAL FIELD

The present disclosure relates to electronic converters.

This disclosure was devised with specific attention paid to the provision of a suppressor or snubber for an electronic converter.

BACKGROUND

Electronic converters for lighting sources comprising, for example, at least one LED (Light Emitting Diode) or other solid-state lighting means may provide a direct current output. Such current may be stable or vary in time, for example in order to regulate the light intensity emitted by the lighting source (so called dimming function).

FIG. 1 shows a possible lighting system comprising an electronic converter 10 and a lighting module 20, comprising for example at least one LED L.

Electronic converter 10 usually comprises a control circuit 102 and a power circuit 12 (for example an AC/DC or DC/DC switching supply) and provides as output a direct current through a power output 106. Such a current may be stable, or else may vary in time. For example, control circuit 102 may set, via a reference channel $I_{ref}$ of power circuit 12, the current required by LED module 20.

For example, such a reference channel $I_{ref}$ may be used in order to regulate the intensity of the light emitted by lighting module 20. Actually, a regulation of the light intensity emitted by LED module 20 may be generally achieved by regulating the average current flowing through lighting module 20, for example by setting a lower reference current $I_{ref}$, or by switching on or off power circuit 12 through a Pulse Width Modulation (PWM) signal.

However, the case wherein module 20 is supplied with a regulated voltage, i.e. wherein converter 12 is a voltage generator, typically requires a current regulator which is connected in series with lighting sources L, in order to limit the current. In this case, the dimming function may be implemented also via such a current regulator, for example:

a) by selectively switching on or off such a current regulator via a driving signal, e.g. a PWM signal, or b) in case of an adjustable current regulator, by setting the reference current of such a current regulator.

Generally speaking there are many types of electronic converters, which are divided mainly into isolated and non-isolated converters. For example, non-isolated electronic converters are "buck", "boost", "buck-boost", "Cuk", "SEPIC" and "ZETA" converters. On the contrary, isolated converters are for example "flyback", "forward", "Half-bridge" and "Full-bridge" converters. Such kinds of converters are well known to the skilled in the art.

For example, FIG. 2 shows the circuit arrangement of a flyback converter.

As is well-known, a flyback converter comprises a transformer T with a primary winding T1 and a secondary winding T2, an electronic switch S, such as for example an n-channel MOSFET transistor (Metal-Oxide-Semiconductor Field-Effect Transistor), or a bipolar or IGBT transistor (Insulated-Gate Bipolar Transistor), a diode D1 and an output capacitor Co.

Specifically, transformer T may be modelled as an inductance Lm, connected in parallel with primary winding T1, which represents the magnetising inductance of transformer T, and an ideal transformer with a given turn ratio 1:n.

In the presently considered example, converter 12 receives as input, via two input terminals, a voltage $V_{in}$, and provides as output, via a supply line 106, a regulated current $i_{out}$. Those skilled in the art will appreciate that voltage $V_{in}$ may also be obtained through an input AC current, for example via a diode or a diode bridge rectifier, and optionally a filtering capacitor.

Specifically, the first input terminal is connected to the first terminal of primary winding T1 of transformer T and the second input terminal represents a first ground $GND_1$. On the contrary, the second terminal of primary winding T1 of transformer T is connected through switch S to ground $GND_1$. Therefore, switch S may be used to selectively activate the current flow through primary winding T1 of transformer T.

On the other hand, the first terminal of secondary winding T2 of transformer T is connected through a diode D1 to a first output terminal, which represents power output 106, and the second terminal of secondary winding T2 of transformer T is connected directly to a second output terminal, which represents a second ground $GND_2$, which due to the isolating effect of transformer T is preferably different from ground $GND_1$ and is therefore denoted with a different ground symbol.

Finally, an output capacitor Co is connected in parallel with the output, i.e. between terminals 106 and $GND_2$.

Therefore, when switch S is closed, primary winding T1 of transformer T is connected directly to input voltage $V_{in}$. This causes an increase of the magnetic flow in transformer T. Therefore, the voltage across secondary winding T2 is negative, and diode D1 is inversely biased. In this condition, output capacitor Co provides the energy required by the load, for example by lighting module 20.

On the contrary, when switch S is open, the energy stored in transformer T is transferred as flyback current to lighting module 20.

As previously mentioned, the control may be in current or voltage. To this purpose, a control unit 112 is typically used which drives switch S so that output voltage $V_{out}$ or output current $i_{out}$ is regulated on a desired value, so as for example reference current $I_{ref}$. To this purpose it is possible to use, as known in itself, a sensor adapted to detect current $i_{out}$ or voltage $V_{out}$.

Typically, control unit 112 drives switch S with Pulse Width Modulation (PWM), wherein switch S is closed during a first operation interval and switch S is opened during a second operation interval. Those skilled in the art will appreciate that such PWM driving and the control of duration of operation intervals are well known, and may be implemented, for example, through a feedback of the output voltage or current through an error amplifier. For example, in the case of a current control, the duration of the first interval is increased until the (average) output current reaches a predetermined threshold.

Such a PWM driving may involve three different operation modes. Specifically, if the current in the magnetising inductance Lm never reaches zero during a switching cycle, the converter is said to operate in a Continuous Current Mode (CCM). On the contrary, when the current in the magnetising inductance Lm reaches zero during the period, the converter is said to operate in a Discontinuous Current Mode (DCM). Typically, the converter operates in a discontinuous mode when the load absorbs a low current, and in a continuous mode at higher levels of absorbed current. The border between the continuous mode, CCM, and the discontinuous mode, DCM, is reached when the current reaches zero, exactly at the end of the switching cycle. Such a limit case is referred to as Transition Mode (TM). Moreover, there is the possibility of driving the switch with a resonant or quasi-resonant driving, wherein switch S is switched when the voltage across said electronic switch (S) is zero, or when a local minimum is reached. Typically the switching frequency, i.e. the sum of the duration of operation periods, is fixed for a CCM or a DCM driving, and is variable for a quasi-resonant driving.

However a flyback converter, and generally every switching power supply, comprises parasitic elements. For example, in a flyback converter one of the most influential elements is transformer T, particularly its leakage inductance. For example, in FIG. 2, the leakage inductance of transformer T is modelled as an inductance Lr connected in series with the secondary winding T2 of transformer T. In a similar way, in a forward converter, both the magnetizing inductance Lm and the leakage inductance Lr constitute parasitic elements. Actually such inductances store energy which often cannot be transferred to the load. For example, in a flyback converter the discharge of the energy stored in the parasitic inductance Lr may cause an overvoltage across switch S. Moreover the zeroing of current through switch S cannot take place with zero voltage, which involves switching losses as well.

Therefore snubbers have been used in the past. Such snubbers are typically divided into the following categories:
dissipative snubber: a dissipative network comprising passive components, particularly resistors;
non-dissipative passive snubber: a circuit comprising one or several reactive components, for example capacitors, which allow for the recovery of the energy stored in the inductive components; and
non dissipative active snubber: a circuit comprising a passive network and one or several switches.
Snubber circuits also have other advantages, such as:
Electromagnetic Interference (EMI) is typically reduced; and
the switching of the switch or switches of the switching supply may take place at zero voltage: it is the so-called Zero-Voltage Switching (ZVS).

Details on the operation of passive snubber circuits are described, for example, in P. C. Todd, "*Snubber circuits: Theory, Design and Application*", Unitrode Corporation, May 1993, the content whereof is incorporated herein by reference.

Details on the operation of non-dissipative snubber circuits, for example for flyback converters, are described in T. Ninomiya, T. Tanaka, and K. Harada, "*Analysis and optimization of a non-dissipative LC turn-off snubber*," IEEE Transactions on Power Electronics, vol. 3, no. 2, pp. 147-156, 1988, or in Chih-Sheng Liao, Keyue M. Smedley, "*Design of high efficiency Flyback converter with energy regenerative snubber*", Conference: Applied Power Electronics Conference and Exposition Annual IEEE Conference—APEC, pp. 796-800, 2008, the contents whereof are incorporated herein by reference.

Finally, active snubber circuits are described for example in B. Andreycak, "*Active clamp and reset technique enhances forward converter performance*", Unitrode Power Supply Design Seminar, SEM-1000, pp. 3-1-3-18, 1994 for forward converters, and in Robert Watson, et al., "*Utilization of an Active-Clamp Circuit to Achieve Soft Switching in Flyback converters*", IEEE Transactions on Power Electronics, V. 11, pp. 162-169, 1996 for flyback converters, the contents whereof are incorporated herein by reference.

The previously described snubber circuits have common features, as they are located on the primary side of the transformer, and they limit the peak or rise-time of the voltage across the main switch. Therefore, such circuits cannot directly snub effects which are caused by components on the secondary side of the transformer.

Document EP 1 202 440 A1 discloses a snubber circuit which is located at the secondary side of a transformer. Specifically, the disclosed snubber circuit comprises two diodes, a capacitor and an inductor. According to document EP 1 202 440 A1 the inductor of such a snubber circuit permits that the current of the primary side switch is smoothly and gradually decreased due to the current supplied from the capacitor of the snubber circuit, so that the voltage of the primary side switch increases with a gradient that a voltage ringing is suppressed.

The inventor has noted that the arrangements disclosed in document EP 1 202 440 A1 have several inconveniences. For example, according to this document, the snubber capacitor on the secondary side is discharged with the same current that will supply the load. Thus, in order to have an important slope reduction of the rise time of the voltage of the primary side switch, a high capacitance is required for the snubber capacitor. However, a high capacitance value implies that also a high inductance is required for the inductor of the snubber circuit in order to charge the snubber capacitor during the switch-on time. Moreover, when the output diode starts to conduct, the leakage inductance of the transformer and the primary side switch capacitance will tend to oscillate as is shown e.g. in FIG. 20A of document EP 1 202 440 A1.

SUMMARY

Various embodiments are provided to improve snubbing techniques.

Actually, inventors have observed that it is also possible to provide a snubber comprising components located on the secondary side of the transformer.

In various embodiments, the electronic converter comprises a transformer with a primary winding and a secondary winding, wherein the primary winding is coupled to an input to receive a power signal, and wherein the secondary winding is coupled to an output comprising a positive terminal and a negative terminal, in order to provide a power signal.

In various embodiments, the electronic converter moreover comprises an electronic switch located between the input and the primary winding, in order to control the current flow through the primary winding of the transformer.

In various embodiments, a snubber circuit is located between the secondary winding and the output.

In various embodiments, a second snubber circuit is associated to the primary winding of the transformer as well, particularly to the electronic switch. Typically, such a snubber circuit comprises a capacitor. However, the operation of the capacitor may also be implemented through the parasitic capacitance of the electronic switch. Therefore, in various embodiments, the sum of the parasitic capacitance of the electronic switch and the capacitance of other possible circuits connected in parallel with the switch is between 10 pF and 1 nF.

In various embodiments, the snubber circuit on the secondary side of the transformer comprises two diodes connected (directly) in series and a capacitor connected (directly) to the intermediate point between both diodes. For example, in various embodiments the cathode of the first diode is connected (directly) to the positive output terminal, and the anode of the second diode is connected (directly) to the negative output terminal.

The connection of the capacitor of the snubber circuit on the secondary side of the transformer depends on the kind of converter. Typically, the capacitor of the snubber circuit on the secondary side is connected (directly) to the leakage inductance of the transformer. For example, if the electronic converter is a flyback converter comprising a diode connected between a terminal of the secondary winding and an output terminal, the capacitor of the snubber circuit is connected (directly) to such a terminal of the secondary winding, i.e. the leakage inductance of the transformer. Conversely, the capacitor could be connected (directly) to the output inductor of a forward converter, a Cuk converter or a ZETA converter.

The previously described snubber circuits allow for the reduction of the voltage across the electronic switch of the converter. For this reason, the converter may be driven in the resonant or quasi-resonant mode, i.e. the electronic converter is closed when the voltage across the electronic switch is zero or has reached a local minimum.

Specifically, during the switch-off time, the primary side snubber circuit and the secondary side snubber circuit will generate a resonance together with the main leakage inductance of the converter.

More specifically, when the primary side switch is opened, the first diode of the snubber circuit is used to discharge the capacitor of the snubber circuit and charge the capacitance associated with the primary side switch. Thus, by dimensioning in a convenient manner both capacitance values, the oscillation produced by the switch capacitance and the leakage inductance may be reduced and almost be eliminated. For example, in various embodiments, the capacitance associated with the primary side switch and the capacitor of the snubber circuit on the secondary side have similar values.

Conversely, when the primary side switch is closed, the second diode of the snubber circuit is used to recharge the capacitor or the snubber circuit on the secondary side. Thus, the capacitance associated with the primary side switch and the capacitor of the snubber circuit on the secondary side should be selected in order to permit that the main leakage inductance of the converter may recharge smoothly the capacitor of the snubber circuit on the secondary side during the switch-on time. For example, such capacitances may be between 100 pF and 1 nF and preferably between 300 pF and 600 pF.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 1 shows a possible lighting system;
FIG. 2 shows the circuit arrangement of a flyback converter.

DETAILED DESCRIPTION

In the following description, numerous specific details are given to provide a thorough understanding of embodiments. The embodiments may be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As previously stated, the present disclosure provides solutions allowing for the implementation of a snubber circuit for a switching supply comprising a transformer, such as for example a flyback, forward, Cuk, SEPIC or ZETA isolated converter.

In various embodiments, the snubber circuit comprises two sub-circuits. The first circuit is located on the primary side of the transformer, i.e. on the side of the transformer to which one or several switches are coupled to control the current flow in the primary winding of the transformer. On the contrary, the second circuit is located on the secondary side of the transformer, i.e. on the side of the transformer whereto the load is coupled.

Figure 3:
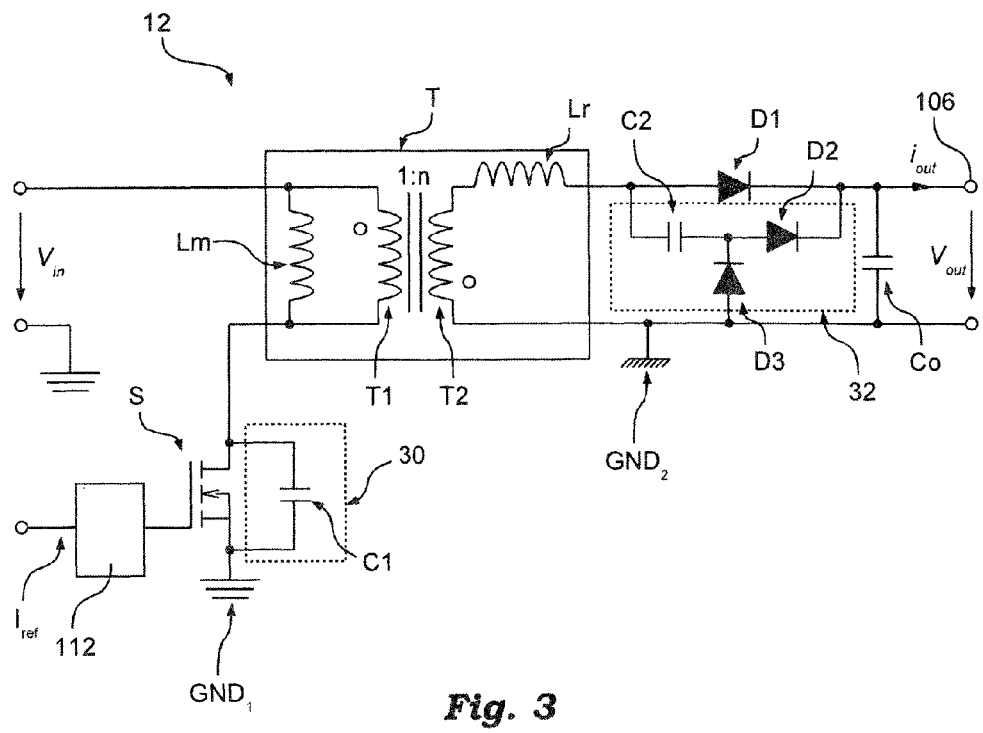
FIGS. 3 to 8 show details of embodiments of snubber circuits according to the present disclosure.
Figure 4A:
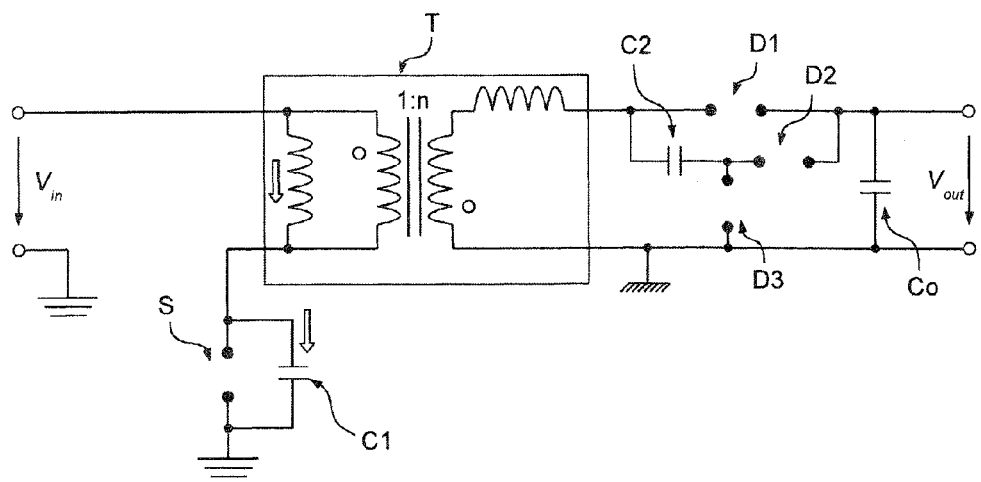
Figure 4B:
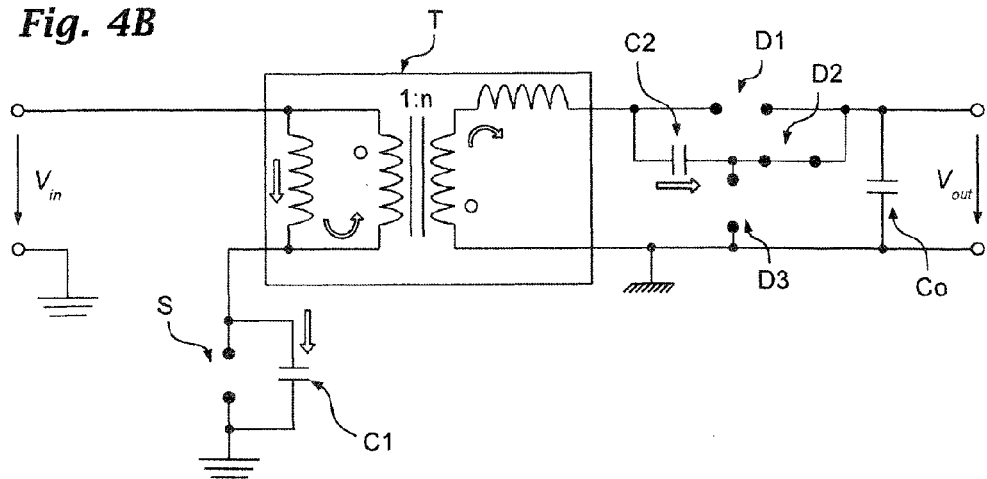
Figure 4C:
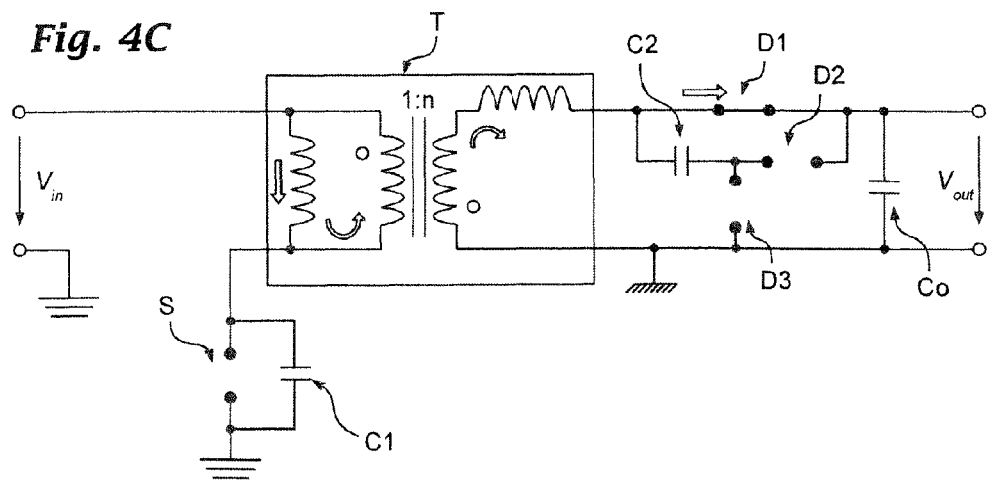
Figure 4D:
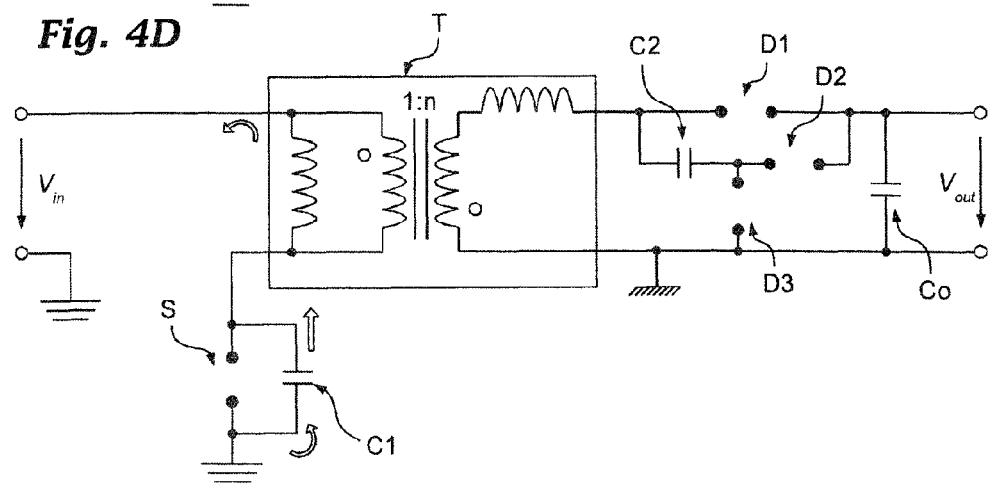
Figure 4E:
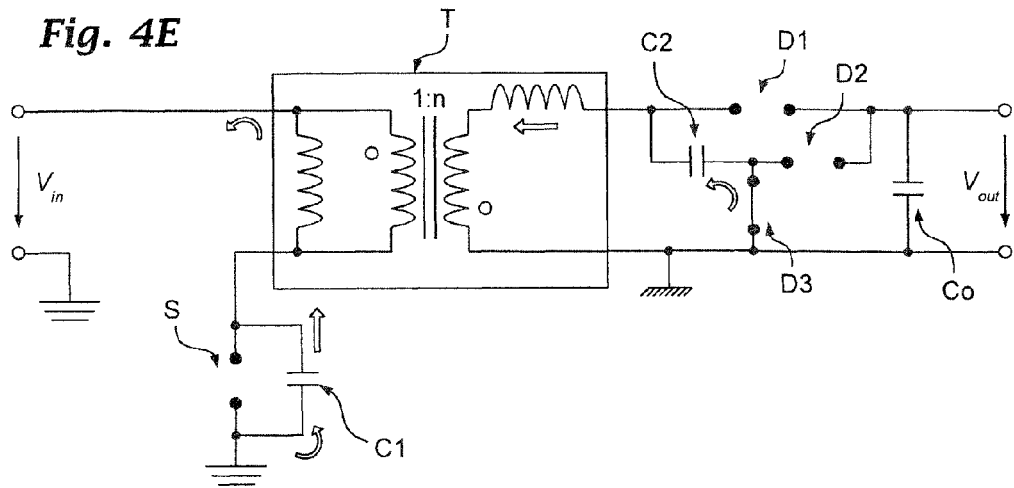
Figure 4F:
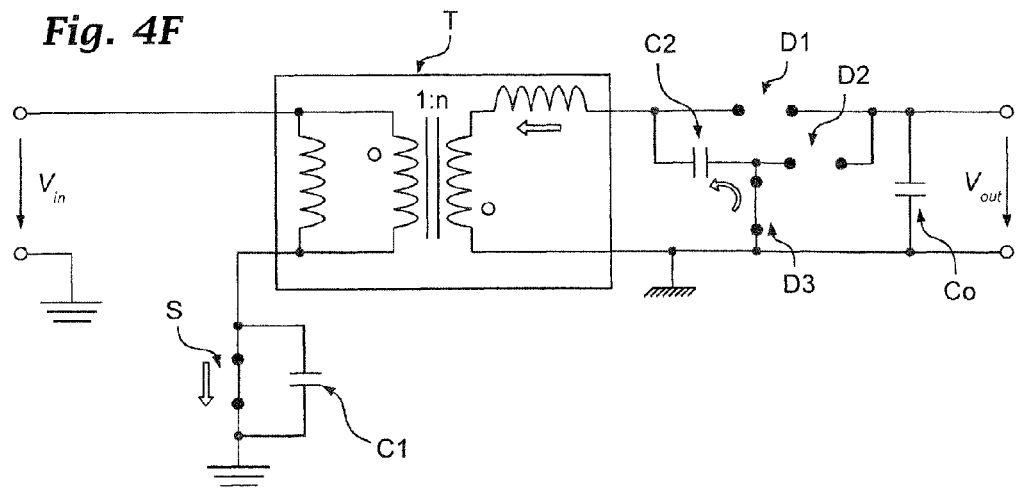
Figure 4G:
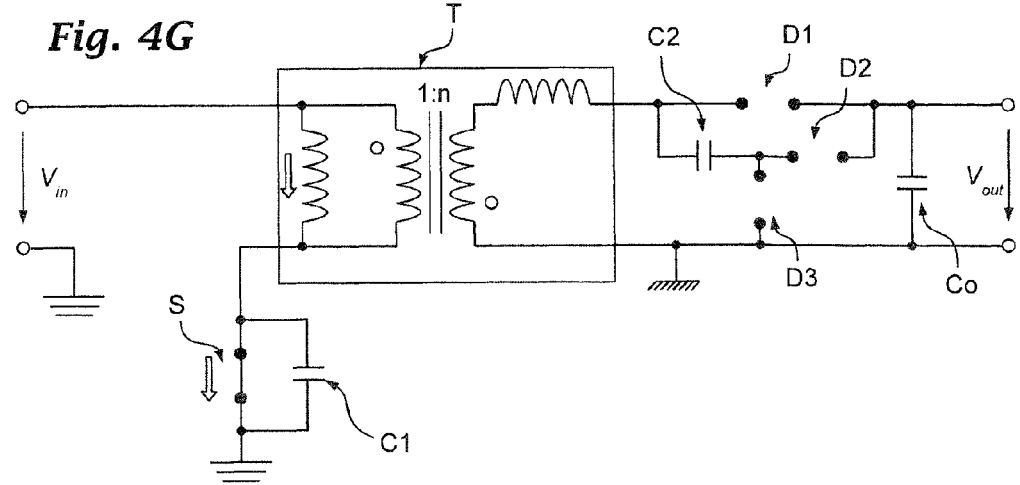
Figures 5A, 5B, 5C, 5D, 5E, 5F, 5G:
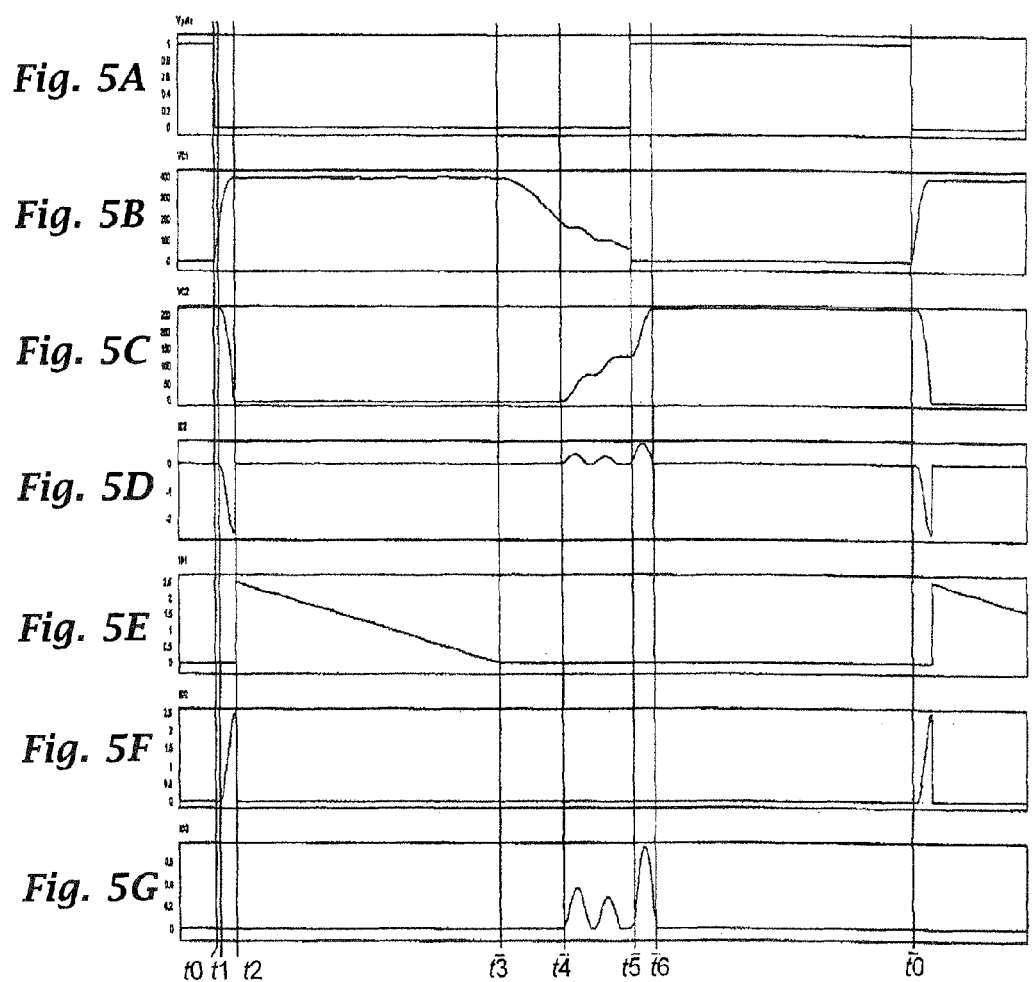

FIG. 3 shows an embodiment of a flyback converter according to the present disclosure. Specifically, the flyback converter shown in FIG. 3 is substantially based on the converter shown in FIG. 2. Therefore, the operation of such a circuit will not be repeated, the attention being focused only on the differences.

Specifically, as previously stated, the converter comprises two additional circuits, i.e. a first additional circuit 30 on the primary side T1 of transformer T and a second additional circuit 32 on the secondary side T2 of transformer T.

In the presently considered embodiment, the first circuit 30 comprises a capacitance C1, which is associated to switch S. Specifically, in the considered embodiment, capacitance C1 is connected directly in parallel with switch S. Such a capacitance C1 may be inherent to switch S, i.e. it may be a parasitic capacitance and/or it may be implemented through a capacitor external to switch S. For example, in various embodiments, the sum of the parasitic capacitance of switch S and the capacitance of possible other capacitors connected in parallel with switch S is between 10 pF and 1 nF.

On the contrary, the second circuit 32 substantially comprises a charge pump.

Specifically, in the considered embodiment, circuit 32 comprises two diodes D2 and D3 connected (directly) in series. In the considered embodiment, such diodes D2 and D3 are connected in turn in parallel to the output capacitor Co, i.e. the cathode of diode D2 is connected (directly) to line 106 and the anode of diode D3 is connected (directly)

to ground $GND_2$. Thus, in the embodiment considered, the snubber circuit does not comprise any additional inductive component.

In the considered embodiment, circuit 32 comprises moreover a capacitor C2, which is connected (directly) between the first output terminal of the secondary winding T2 of transformer T, i.e. to the anode of diode D, and the intermediate point between the diodes D2 and D3, i.e. to the anode of diode D2 and the cathode of diode D3.

For example, typical values for capacitors are a few hundreds of pF, i.e. the value of capacitances C1 and C2 ranges from 100 pF to 1 nF and preferably between 300 pF and 600 pF. Thus, preferably, the capacitances C1 and C2 have similar values, and the values should be selected in order to permit that the leakage inductance of the transformer T may recharge smoothly the capacitor C2 during the switch-on time as will be described in the following.

In the following a possible embodiment of the driving of such a flyback converter will be described with reference to FIGS. 4a to 4g and to FIGS. 5a to 5g. Specifically, FIGS. 4a to 4g show different equivalent circuit arrangements for different operation periods. On the other hand, FIGS. 5a to 5g show typical waveforms respectively for voltage $V_s$ across switch S, voltage $V_{C1}$ across capacitor C1, voltage $V_{C2}$ across capacitor C2, current $i_{C2}$ flowing through capacitor C2, current $i_{D1}$ flowing through diode D1, current $i_{D2}$ flowing through diode D2 and current $i_{D2}$ flowing through diode D3.

Specifically, at a time instant t0, switch S is opened. During the following operation period (see FIG. 4a), the energy stored in the magnetising inductance Lm charges capacitor C1 until its voltage $V_{C1}$ equals $$V_{in} + n \cdot (V_{out} - V_{C2}) \quad (1)$$

If the flyback converter is operated at a Zero Voltage Switching (ZVS), the voltage across capacitor C1 would be exactly $n \cdot V_{out}$.

At a time instant t1, the sum of the voltage at secondary winding T2 and capacitor C2 is sufficient to switch diode D2 on. Therefore, during the following operation period (see FIG. 4b), capacitor C2 stars discharging, while capacitor C1 keeps on charging.

At a time instant t2, capacitor C2 is completely discharged. Specifically, the period between instant t2 and instant t1 is:

$$t2 - t1 = \frac{\pi}{2} \sqrt{Lr \cdot (C1 + C2)} \quad (2)$$

Therefore, at instant t2 diode D2 is opened and diode D1 is closed. As a consequence, during the following operation period (see FIG. 4c), the converter behaves as a conventional flyback converter, wherein the energy stored in the magnetising inductance Lm is discharged towards output capacitor Co and the load.

At a time instant t3, magnetising inductance Lm is discharged, and as a consequence diode D1 is opened. Therefore, during the following operation period (see FIG. 4d), capacitor C1 starts discharging through inductance Lm. This represents a first resonant circuit LC (Lm and C1) which creates an oscillation allowing for ZVS or quasi-ZVS. Specifically, the resonant transition is set by $$\sqrt{Lm \cdot C1} \quad (3)$$

At a time instant t4, the voltage at secondary winding T2 is sufficient to switch diode D3 on.

Therefore, during the following operation period (see FIG. 4e), a second oscillation begins as well, being generated by a second resonant circuit LC (Lr and C2).

Therefore, the sum of the oscillations creates a complex multi-resonant transition which charges capacitor C2.

At a time instant t5, switch S is closed. Specifically, in the considered embodiment, this takes place at quasi-ZVS. Therefore, during the following operation period (see FIG. 4f) capacitor C2 is charged through the remaining energy stored in the leakage inductance Lr.

At a time instant t6, the leakage inductance is discharged and diode D3 is opened. Therefore, during the following operation period (see FIG. 4g) the converter behaves as a conventional flyback converter, wherein the magnetising inductance Lm is charged.

Afterwards, the previously described operation periods will be repeated.

As previously stated, the same snubber circuit may be used in other types of converters.

Typically, the snubber circuit at the secondary side should be positioned in order to bypass the main rectifying diode, e.g. in case of a single voltage output filter, such as in the Flyback or SEPIC topology, or the filter inductor, e.g. in case of a double current voltage output filter, such as in the Forward, Cuk or Zeta topology.

Figure 6:
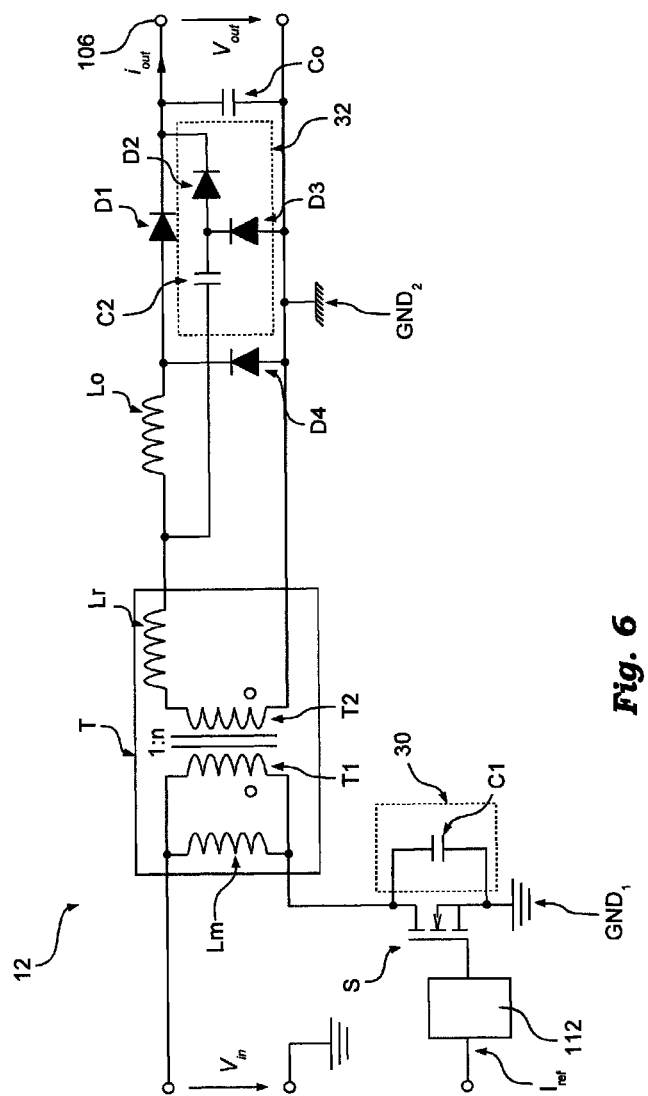

For example, FIG. 6 shows an embodiment of a forward converter.

Those skilled in the art will appreciate that a forward converter has, on the primary side T1 of transformer T, the same electrical connection as a flyback converter. On the contrary, on the secondary side, the forward converter comprises an inductor Lo, two diodes D1 and D4 and a capacitor Co. Specifically, inductor Lo is connected between the first terminal of the secondary winding T2 of transformer T and the anode of diode D1. The cathode of diode D1 is connected to line 106, and diode D4 is connected between the second terminal of secondary winding T2 of transformer T, which represents ground $GND_2$, and the anode of diode D1. Finally, capacitor Co is connected in parallel to the load, i.e. between line 106 and ground $GND_2$.

In this case, circuits 30 and 32 are not modified; what changes is only the connection of circuit 32 on the secondary side T2 of transformer T.

Specifically, in the considered embodiment, the cathode of diode D2 is still connected (directly) to the positive output terminal, i.e. line 106, the anode of diode D3 is connected (directly) to ground $GND_2$ and capacitor C2 is connected (directly) to the first terminal of the secondary winding T2 of the transformer, i.e. to the intermediate point between transformer T and inductor Lo.

Figure 7:
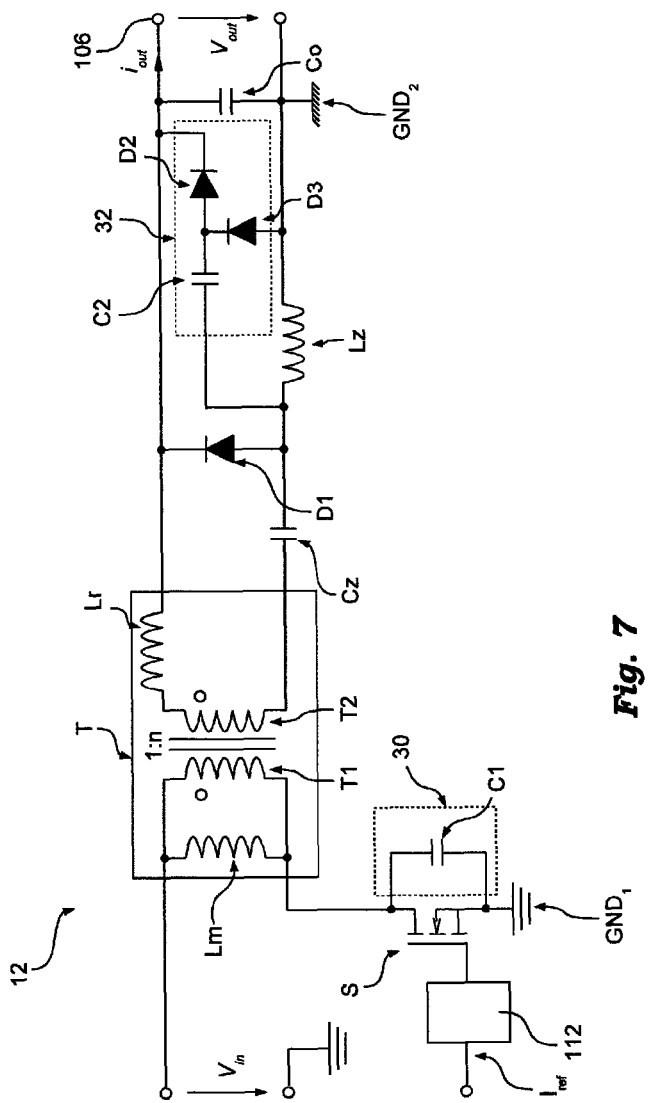

On the contrary, FIG. 7 shows an embodiment of an isolated ZETA converter.

Those skilled in the art will appreciate that also a ZETA converter has, on the primary side of transformer T, the same electrical connection as a flyback converter. On the contrary, on the secondary side, the ZETA converter comprises an inductor Lz, a diode D1 and two capacitors Co and Cz. Specifically, the first terminal of the secondary winding T2 of transformer T is connected directly to the output, i.e. to line 106. On the other hand, the second terminal of the secondary winding T2 of transformer T is connected through capacitor Cz to the anode of diode D1. The cathode of diode D1 is also directly connected to line 106. Finally, the second output terminal, which represents ground $GND_2$, is connected through inductor Lz also to the anode of diode D1.

In this case as well, circuits 30 and 32 remain the same, and only the connection of circuit 32 on the secondary side T2 of transformer T changes.

Specifically, in the considered embodiment, the cathode of diode D2 is still connected (directly) to the positive output terminal, i.e. line 106, the anode of diode D3 is connected (directly) to the second output terminal, i.e. ground $GND_2$, and capacitor C2 is connected (directly) to the anode of diode D1, i.e. between capacitor Cz and inductor Lz.

Generally speaking, both circuit 30 and circuit 32 may comprise other components as well.

Figure 8:
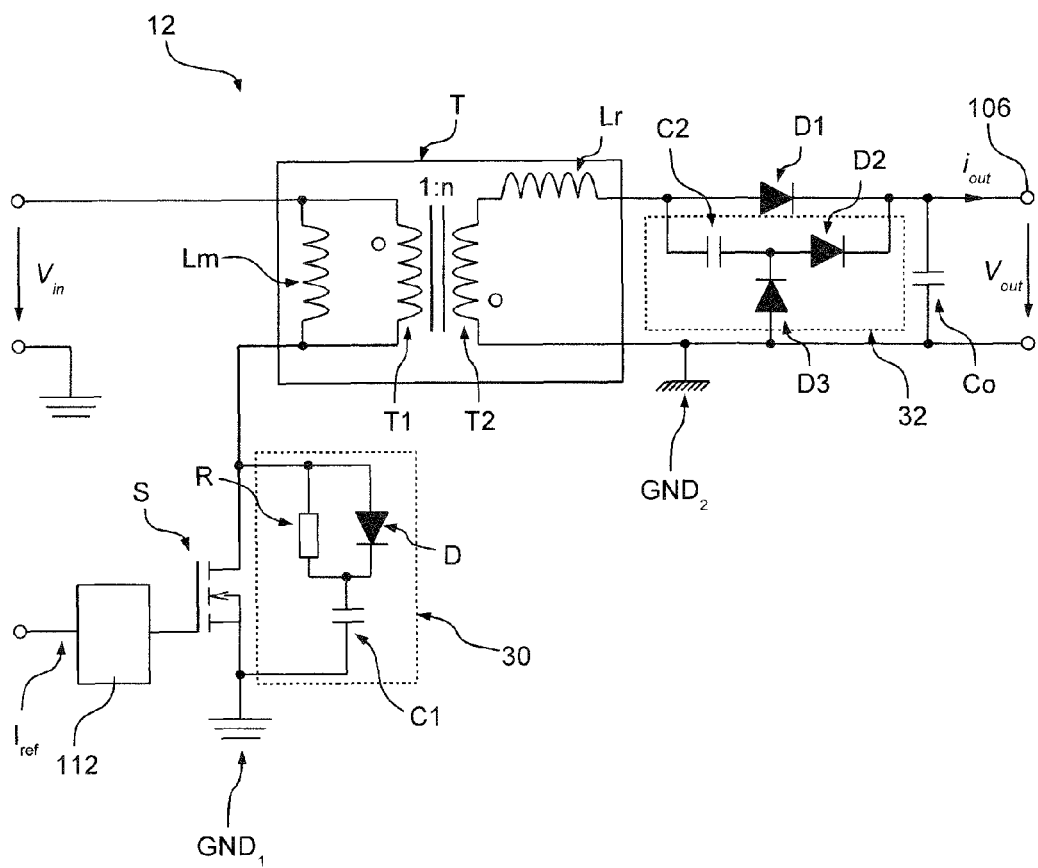

For example, FIG. 8 shows an embodiment of a flyback converter, the circuit 30 whereof comprises an RCD network, comprising capacitor C1, a diode D and a resistor R.

Specifically, in the considered embodiment, diode D and capacitor C1 are connected in series and resistor R and diode D are connected in parallel, so that the charging of capacitor C1 is made easier by diode D, while the discharging of capacitor C1 is slowed down by resistor R.

Those skilled in the art will appreciate that such an RCD circuit may also be used in the other types of converters.

Of course, without prejudice to the underlying principle of the disclosure, the details and the embodiments may vary, even appreciably, with respect to what has been described by way of example only, without departing from the scope of the invention as defined by the claims that follow.

The invention claimed is:

1. An electronic converter comprising:
   an electronic converter input for receiving an input power signal and an electronic converter output comprising a positive terminal and a negative terminal for providing an output power signal,
   a transformer with a primary winding and a secondary winding, wherein the primary winding is coupled to the electronic converter input, and wherein the secondary winding is coupled to the electronic converter output,
   an electronic switch arranged between the electronic converter input and the primary winding, wherein the electronic switch is configured to control a current flow through the primary winding,
   a snubber circuit arranged between the secondary winding and the electronic converter output, wherein the snubber circuit comprises a first and a second diode connected in series and a capacitor connected to an intermediate point between the first diode and the second diode, wherein the cathode of the first diode is directly connected to the positive terminal of the electronic converter output and the anode of the second diode is directly connected to the negative terminal of the electronic converter output; and
   wherein the electronic converter is selected from the group consisting of:
   a flyback converter comprising a third diode connected between a first terminal of said secondary winding and said positive terminal of said output, and wherein said capacitor of said snubber circuit is connected to said first terminal of said secondary winding,
   a forward converter comprising an inductor and a third diode connected in series between a first terminal of said secondary winding and said positive terminal of said output, and wherein said capacitor of said snubber circuit is connected to said first terminal of said secondary winding, or
   a ZETA converter comprising a capacitor and an inductor connected in series between a terminal of said secondary winding and a terminal of said output, wherein said capacitor of said snubber circuit is connected to the intermediate point between said capacitor and said inductor; and
   wherein the inductor is not disposed between the snubber circuit and the electronic converter output.

2. The electronic converter according to claim 1, wherein an amount of a capacitance for the electronic switch is substantially similar to an amount of the capacitance for the snubber circuit.

3. The electronic converter according to claim 1, comprising a further circuit connected in parallel with said electronic switch, wherein said further circuit comprises a diode and a capacitor connected in series, and a resistor connected in parallel with said diode of said further circuit.

* * * * *